United States Patent
Golas

(10) Patent No.: US 11,423,520 B2
(45) Date of Patent: Aug. 23, 2022

(54) DISTORTION-CORRECTED RASTERIZATION

(71) Applicant: Facebook Technologies, LLC, Menlo Park, CA (US)

(72) Inventor: Abhinav Golas, Burlingame, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/085,940

(22) Filed: Oct. 30, 2020

(65) Prior Publication Data

US 2022/0138915 A1 May 5, 2022

(51) Int. Cl.
*G06T 5/00* (2006.01)
*G06T 15/10* (2011.01)
*G06T 3/00* (2006.01)

(52) U.S. Cl.
CPC ............ *G06T 5/006* (2013.01); *G06T 3/0031* (2013.01); *G06T 15/10* (2013.01); *G06T 2207/20021* (2013.01)

(58) Field of Classification Search
CPC .................................................... G06T 5/006
See application file for complete search history.

(56) References Cited

U.S. PATENT DOCUMENTS

| | | | | |
|---|---|---|---|---|
| 2007/0035706 A1* | 2/2007 | Margulis | ................ | G09G 3/342 353/122 |
| 2010/0097502 A1* | 4/2010 | Hagiwara | ............ | H04N 5/3572 348/241 |
| 2012/0087581 A1* | 4/2012 | Rasmusson | .......... | H04N 19/428 382/166 |
| 2012/0140027 A1* | 6/2012 | Curtis | .................. | H04N 13/261 348/43 |
| 2013/0241938 A1* | 9/2013 | Gruber | .................. | G06T 15/005 345/501 |
| 2014/0267232 A1* | 9/2014 | Lum | ....................... | G06T 19/20 345/419 |
| 2019/0096041 A1* | 3/2019 | Allu | ....................... | G06T 3/0012 |
| 2019/0102865 A1* | 4/2019 | Hensley | .................. | G06F 30/30 |
| 2019/0102868 A1* | 4/2019 | Beric | ................... | H04N 5/3572 |
| 2020/0143585 A1 | 5/2020 | Seiler et al. | | |

(Continued)

OTHER PUBLICATIONS

Bastian J., et al., "Modeling the Perceptual Effects of Lens Distortion via an Immersive Virtual Reality System," Technical Report DHPC-086, Adelaide University, Nov. 1, 1999, XP009100432, Chapter 3, 87 pages.

(Continued)

*Primary Examiner* — Phi Hoang
(74) *Attorney, Agent, or Firm* — Baker Botts L.L.P.

(57) ABSTRACT

In one embodiment, a method includes projecting a triangle primitive of an object defined in three-dimensional space onto a two-dimensional space, accessing a distortion map generated based on distortion characteristics of a display system, distorting a grid representation of a screen of the display system using the distortion map, determining a visibility of the triangle primitive relative to pixels of the screen by comparing the projected triangle primitive and the distorted grid representation of the screen, rendering an image based on the determined visibility of the triangle primitive, the rendered image being configured to be displayed by the screen of the display system having the distortion characteristics.

20 Claims, 11 Drawing Sheets

Parametric:
(ext_X, ext_Y) *
distortion (-1, 1)
Pixel: (0, 0)

Parametric:
(ext_X, ext_Y) *
distortion (1, 1)
Pixel: (width, 0)

Parametric: (ext_X, ext_Y) * distortion (0, 0)
Pixel: (width/2, height/2)

Parametric:
(ext_X, ext_Y) *
distortion (-1,-1)
Pixel: (0, height)

Parametric:
(ext_X, ext_Y) *
distortion (1,-1)
Pixel: (width, height)

(56) References Cited

U.S. PATENT DOCUMENTS

2020/0380744 A1* 12/2020 Valient .................... G06T 11/40
2021/0035350 A1* 2/2021 Urbina Escos ........ G06N 20/00
2021/0042984 A1* 2/2021 Fenney .................... G06T 7/11

OTHER PUBLICATIONS

International Search Report and Written Opinion for International Application No. PCT/US2021/052912, dated Jan. 26, 2022, 9 Pages.

* cited by examiner

DISTORTION-CORRECTED RASTERIZATION

TECHNICAL FIELD

This disclosure generally relates to artificial-reality system, and in particular, related to rasterization and visibility computation.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for determining which pixels/samples/fragments to shade for a given primitive while rendering a digital image that, when displayed, will appear distorted due to a variety of factors. The variety of factors may include, but not limited to, lens distortion, misalignments, chromatic aberrations, or any suitable factor. A traditional Graphics Processing Unit (GPU) hardware may solve the visibility problem using a technique called rasterization to determine which pixels/samples/fragments within an image are impacted by a primitive (e.g. a triangle primitive). Rasterization in traditional GPUs relies upon an assumption that inter-pixel spacing in the X and Y direction is constant. Having this assumption allows highly efficient hardware implementations of rasterizers used in all modern GPUs. However, when an image is presented to a user through an AR/VR device, the image may be distorted due to lens distortion, panel misalignment, etc. To counteract the distortion, traditional methods would first render an image using the traditional graphics pipeline and then post-process the rendered image to account for the anticipated distortion that the user would observe. The post-processing step, however, may consume excess power and may degrade the quality of the image. Especially for resource-constrained devices such as mobile AR/VR headsets, the cost of distortion correction needs to be minimized. The embodiments disclosed herein may allow a GPU to render an inverse-distorted image directly to an AR/VR display using a distortion map.

In particular embodiments, a computing device may project a triangle primitive of an object defined in three-dimensional space onto a two-dimensional space. A screen of a display system may be represented by a grid. The grid representation may comprise one or more tiles. A tile may comprise one or more blocks. A block may comprise M×N pixels. In particular embodiments, both M and N may be power-of-2 integers. The computing device may access a distortion map generated based on distortion characteristics of the display system. The distortion map may define a distortion-applied location in the screen of the display system for each corner of each block in the grid representation. The distortion characteristics may indicate that each block on the screen of the display system may have piece-wise linear characteristic, or, that each block on the screen or the display system may be approximated to have piece-wise linear characteristic. A distortion-applied location of any point within a piece-wise linear block may be determined by a bi-linear interpolation of distortion-applied locations of four corners of the block. The computing device may distort the grid representation of the screen of the display system using the distortion map. The computing device may determine a visibility of the triangle primitive relative to pixels of the screen by comparing the projected triangle primitive and the distorted grid representation of the screen. To determine the visibility of the triangle primitive relative to pixels of the screen, the computing device may first identify candidate blocks whose bounding boxes overlap with a bounding box of the projected triangle primitive for each tile. The computing device may perform a recursive coarse visibility test for a tile against the projected triangle primitive to identify candidate blocks within the tile. Then, the computing device may identify candidate sub-blocks of a pre-determined size that overlap with the projected triangle primitive for each of the identified candidate blocks. The computing device may perform a recursive fine visibility test for a block against the projected triangle primitive to identify candidate sub-blocks of the pre-determined size within the block. Finally, the computing device may determine whether each pixel within each candidate sub-block covers the projected triangle primitive. To determine whether the pixel covers the projected triangle primitive, the computing device may identify a sampling location within the pixel. The computing device may determine whether the identified location is on a pre-determined side of each of directional edges of the projected triangle primitive. The computing device may render an image based on the determined visibility of the triangle primitive. The rendered image may be configured to be displayed by the screen of the display system that has the distortion characteristics.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
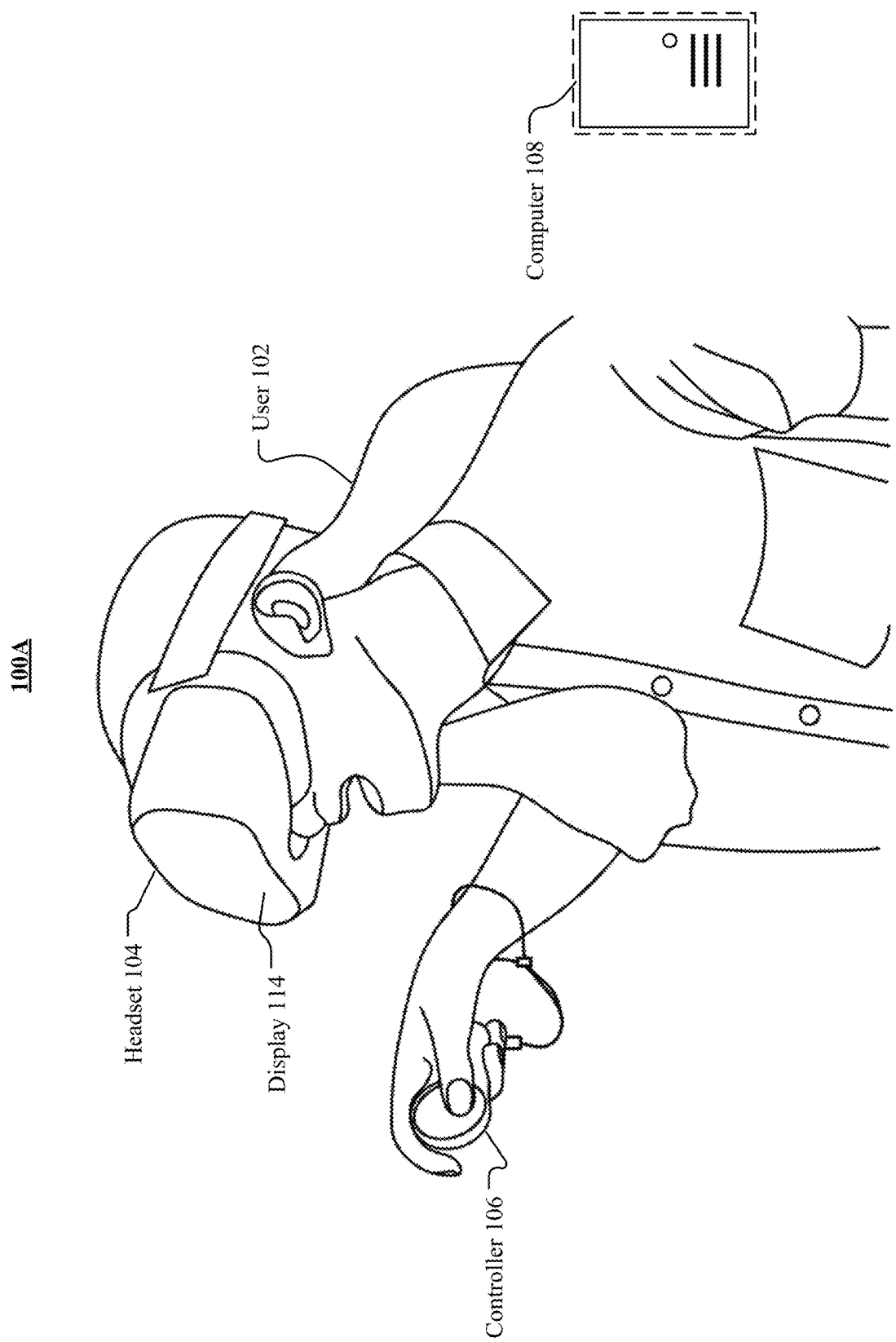
FIG. 1A illustrates an example artificial reality system.

FIG. 1A illustrates an example artificial reality system 100A. In particular embodiments, the artificial reality system 100A may comprise a headset 104, a controller 106, and a computing device 108. A user 102 may wear the headset 104 that may display visual artificial reality content to the user 102 through one or more displays 114. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may include a microphone to capture voice input from the user 102. The headset 104 may be referred as a head-mounted display (HDM). Images displayed on the one or more displays 114 may be distorted due to lens distortion, panel misalignment, etc. The controller 106 may comprise a trackpad and one or more buttons. The controller 106 may receive inputs from the user 102 and relay the inputs to the computing device 108. The controller 206 may also provide haptic feedback to the user 102. The computing device 108 may be connected to the headset 104 and the controller 106 through cables or wireless connections. The computing device 108 may control the headset 104 and the controller 106 to provide the artificial reality content to and receive inputs from the user 102. The computing device 108 may be a standalone host computing device, an on-board computing device integrated with the headset 104, a mobile device, or any other hardware platform capable of providing artificial reality content to and receiving inputs from the user 102.

Figure 1B:
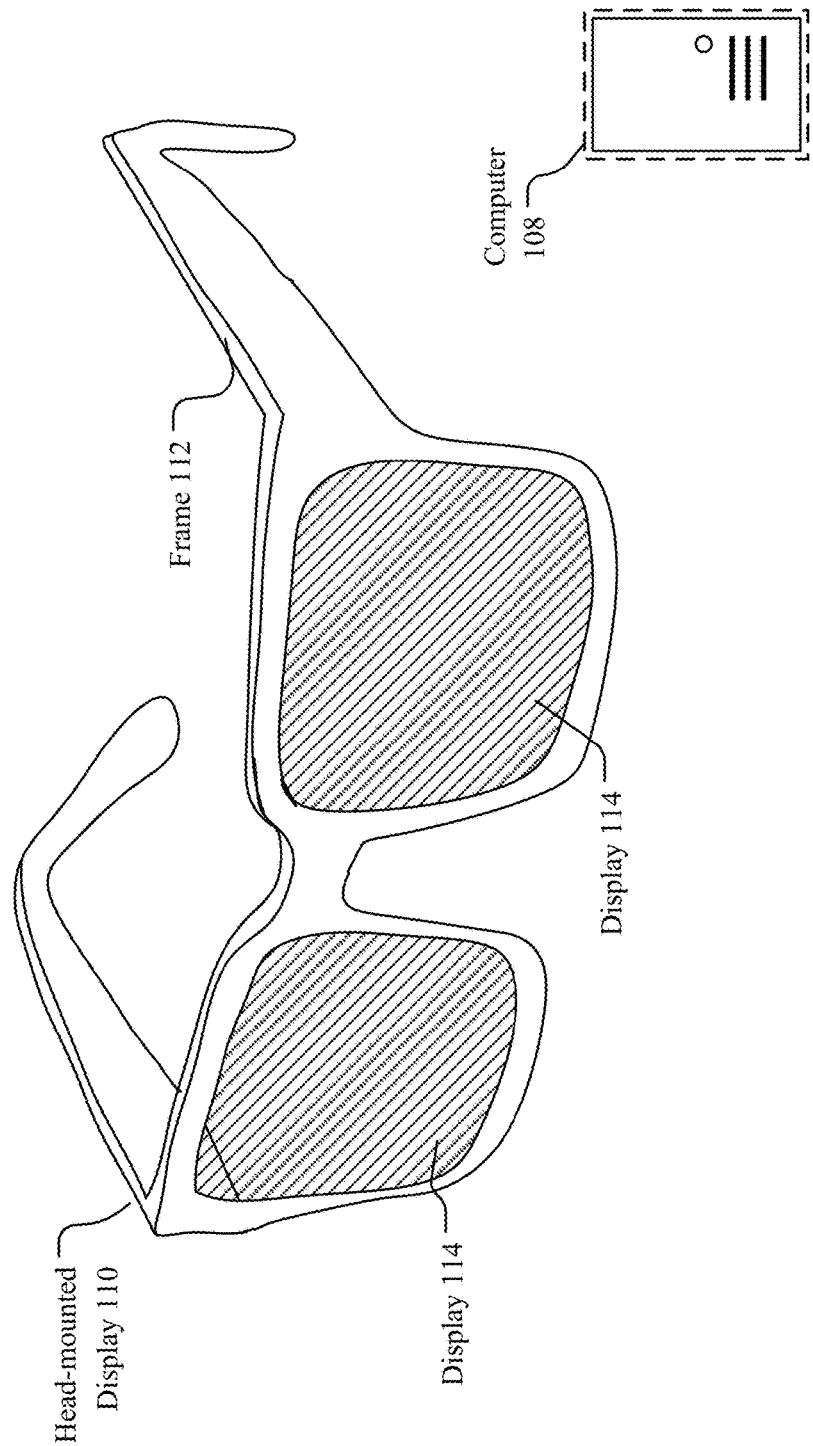
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing device 108. The displays 114 may be transparent or translucent allowing a user wearing the HMD 110 to look through the displays 114 to see the real world and displaying visual artificial reality content to the user at the same time. Images displayed on the one or more displays 114 may be distorted due to lens distortion, panel misalignment, etc. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The HMD 110 may include a microphone to capture voice input from the user. The augmented reality system 100B may further include a controller comprising a trackpad and one or more buttons. The controller may receive inputs from users and relay the inputs to the computing device 108. The controller may also provide haptic feedback to users. The computing device 108 may be connected to the HMD 110 and the controller through cables or wireless connections. The computing device 108 may control the HMD 110 and the controller to provide the augmented reality content to and receive inputs from users. The computing device 108 may be a standalone host computer device, an on-board computer device integrated with the HMD 110, a mobile device, or any other hardware platform capable of providing artificial reality content to and receiving inputs from users.

In particular embodiments, the computing device 108 may determine which pixels/samples/fragments to shade for a given primitive while rendering a digital image that, when displayed, will appear distorted due to a variety of factors. The variety of factors may include, but not limited to, lens distortion, misalignments, chromatic aberrations, or any suitable factor. A traditional Graphics Processing Unit (GPU) hardware may solve the visibility problem using a technique called rasterization to determine which pixels/samples/fragments within an image are impacted by a primitive (e.g. a triangle primitive). Rasterization in traditional GPUs relies upon an assumption that inter-pixel spacing in the X and Y direction is constant. Having this assumption allows highly efficient hardware implementations of rasterizers used in all modern GPUs. However, when an image is presented to a user through an AR/VR device, the image may be distorted due to lens distortion, panel misalignment, etc. To counteract the distortion, traditional methods would first render an image using the traditional graphics pipeline and then post-process the rendered image to account for the anticipated distortion that the user would observe. The post-processing step, however, may consume excess power and may degrade the quality of the image. Especially for resource-constrained devices such as mobile AR/VR headsets, the cost of distortion correction needs to be minimized. The embodiments disclosed herein may allow a GPU to render an inverse-distorted image directly to an AR/VR display using a distortion map.

In particular embodiments, a computing device 108 may project a triangle primitive of an object defined in three-dimensional space onto a two-dimensional space. A screen of a display system may be represented by a grid. The grid representation may comprise one or more tiles. A tile may comprise one or more blocks. A block may comprise M×N pixels. In particular embodiments, both M and N may be power-of-2 integers. The computing device 108 may access a distortion map generated based on distortion characteristics of the display system. The distortion map may define a distortion-applied location in the screen of the display system for each corner of each block in the grid representation. The distortion characteristics may indicate that each block on the screen of the display system may have piece-wise linear characteristic. A distortion-applied location of any point within a piece-wise linear block may be determined by a bi-linear interpolation of distortion-applied locations of four corners of the block. The computing device 108 may distort the grid representation of the screen of the display system using the distortion map. The computing device 108 may determine a visibility of the triangle primitive relative to pixels of the screen by comparing the projected triangle primitive and the distorted grid representation of the screen. To determine the visibility of the triangle primitive relative to pixels of the screen, the computing device 108 may first identify candidate blocks whose bounding boxes overlap with a bounding box of the projected triangle primitive for each tile. The computing device 108 may perform a recursive coarse visibility test for a tile against the projected triangle primitive to identify candidate blocks within the tile. Then, the computing device 108 may identify candidate sub-blocks of a pre-determined size that overlap with the projected triangle primitive for each of the identified candidate blocks. The computing device 108 may perform a recursive fine visibility test for a block against the projected triangle primitive to identify candidate sub-blocks of the pre-determined size within the block. Finally, the computing device 108 may determine whether each pixel within each candidate sub-block covers the projected triangle primitive. To determine whether the pixel covers the projected triangle primitive, the computing device 108 may identify a sampling location within the pixel. In particular embodiments, the sampling location within the pixel may be a center of the pixel. The computing device 108 may determine whether the identified location is on a pre-determined side of each of directional edges of the projected triangle primitive. The computing device 108 may render an image based on the determined visibility of the triangle primitive. The rendered image may be configured to be displayed by the screen of the display system that has the distortion characteristics. The method disclosed herein may be applied to any display system. In particular embodiments, the display system may not be associated with any distortion. The distortion map may be generated based on distortion characteristics (i.e., no distortion at any location of the screen in this case) of the display system. Although this disclosure describes determining which pixel covers a projected triangle primitive in a particular manner, this disclosure contemplates determining which pixel covers a projected triangle primitive in any suitable manner.

Figure 2:
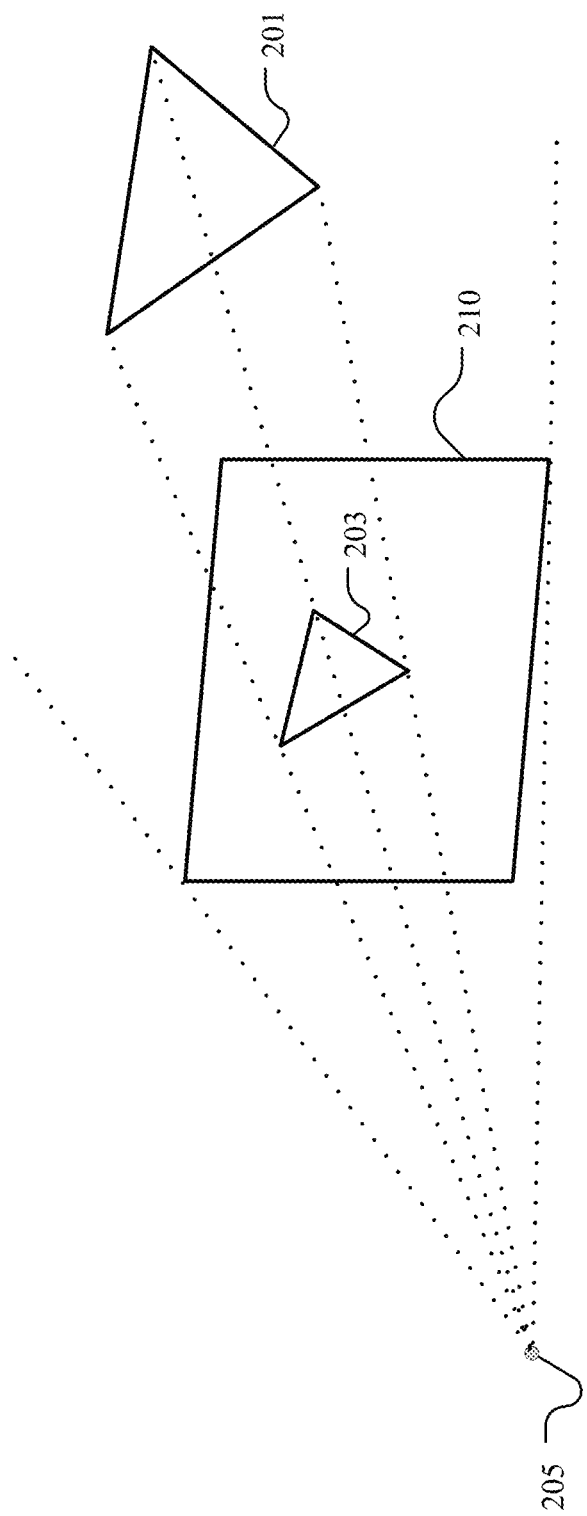
FIG. 2 illustrates an example projection of a triangle primitive of an object defined in a three-dimensional space into a two-dimensional space.

In particular embodiments, a computing device 108 may project a triangle primitive of an object defined in a three-dimensional space onto a two-dimensional space. In particular embodiments, the object may be a virtual object, which is a virtual embodiment of an entity in a scene, replacing a real-world object, such as a table, a person, etc. A primitive may be a building block of the object in the three-dimensional space. Although a primitive can be any polygon, the polygon primitive may be reduced into one or more triangle primitives. FIG. 2 illustrates an example projection of a triangle primitive of an object defined in a three-dimensional space into a two-dimensional space. As an example and not by way of limitation, illustrated in FIG. 2, a computing device 108 may project a triangle primitive 201 belonging to an object defined in the three-dimensional space onto a two-dimensional display space 210. For the projection, the computing device 108 may identify a point on the two-dimensional display space 210 that intersects with a vector from a camera/eye location 205 to each vertex of the triangle primitive 201 in the three-dimensional space. A triangle connecting the identified points on the two-dimensional display space 210 may be a projected triangle primitive 203. The projected triangle primitive 203 may locate in a region of the display space 210. The computing device 108 may determine whether a region of the display space 210 covers the projected triangle primitive 203. Although this disclosure describes projecting a triangle primitive of an object defined in a three-dimensional space onto a two-dimensional space in a particular manner, this disclosure contemplates projecting a triangle primitive of an object defined in a three-dimensional space onto a two-dimensional space in any suitable manner.

Figure 3A:
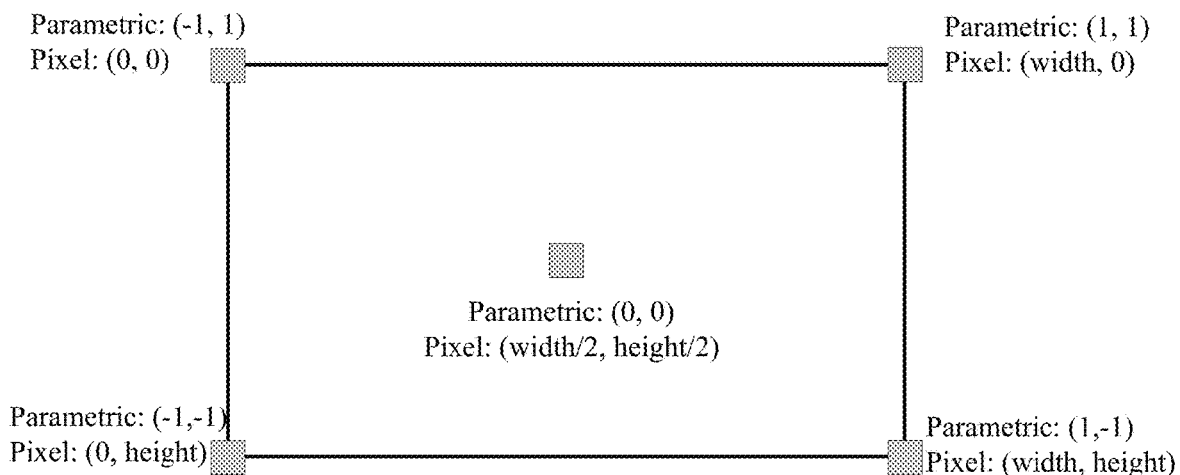
FIG. 3A illustrates an example non-distorted normalized display coordinate system.

FIG. 3A illustrates an example non-distorted normalized display coordinate system. Parametric coordinates may indicate a relative location within a normalized display space. The parametric coordinates span in [−1.0, 1.0] range for each axis. Thus, any location in the display space can be represented by a tuple of real numbers in [−1.0, 1.0] range. A parametric coordinate (−1.0, 1.0) may indicate the upper-left corner of the normalized display space. A parametric coordinate (−1.0, −1.0) may indicate the lower-left corner of the normalized display space. A parametric coordinate (1.0, 1.0) may indicate the upper-right corner of the normalized display space. A parametric coordinate (1.0, −1.0) may indicate the lower-right corner of the normalized display space. A parametric coordinate (0.0, 0.0) may indicate the center of the normalized display space. Pixel coordinates may indicate positions of pixel within the normalized display space. The pixel coordinates span integer numbers within [0, width] for horizontal axis and within [0, height] for vertical axis. The pixel coordinate for the upper-left corner of the normalized display space may be (0, 0). The pixel coordinate for the lower-left corner of the normalized display space may be (0, height). The pixel coordinate for the upper-right corner of the normalized display space may be (width, 0). The pixel coordinate for the lower-right corner of the normalized display space may be (width, height). The pixel coordinate for the center of the normalized display space may be (width/2, height/2). In particular embodiments, a screen of a display system may be represented by a grid. The grid representation may comprise one or more tiles. A tile may comprise one or more blocks. A block may comprise M×N pixels. In particular embodiments, both M and N may be power-of-2 integers.

Figure 3B:
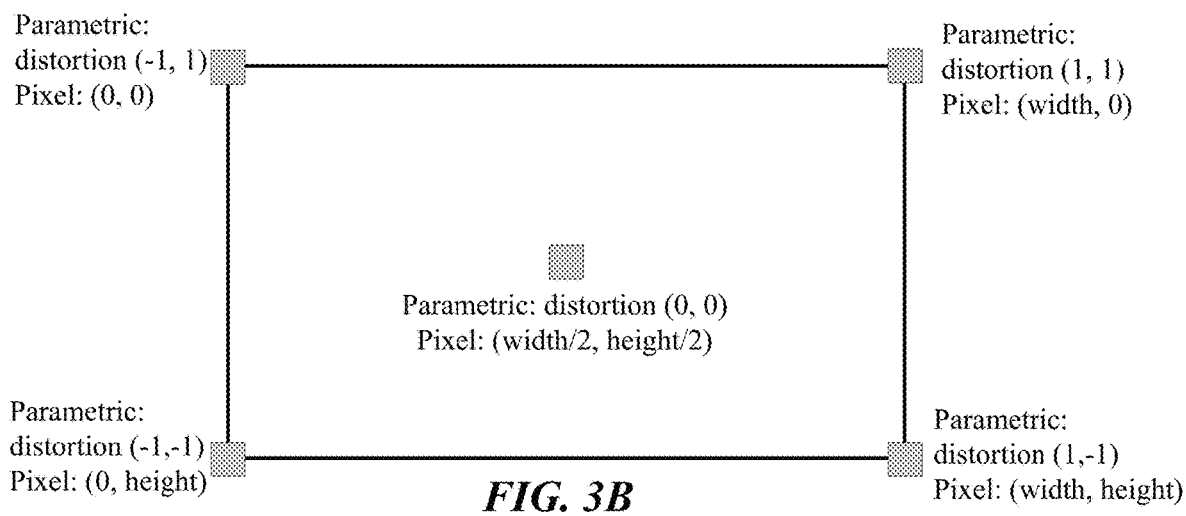
FIG. 3B illustrates an example distorted normalized display coordinate system.

In particular embodiments, the computing device 108 may access a distortion map generated based on distortion characteristics of the display system. The distortion map may define a distortion-applied location in the screen of the display system for each corner of each block in the grid representation. In particular embodiments, the display system may not be associated with any distortion. The distortion map may be generated based on distortion characteristics (i.e., no distortion at any location of the screen) of the display system. FIG. 3B illustrates an example distorted normalized display coordinate system. In the distorted normalized display space, distortion (x, y) may indicate a distortion-applied location of a point represented by the parametric coordinate (x, y). Suppose that a pixel coordinate (a, b) corresponds to a parametric coordinate (x, y). Then, a distortion-applied location of the pixel (a, b) may be distortion (x, y). In particular embodiments, the computing device 108 may distort a grid representation of a screen of the display system using the distortion map. If the pixel (a, b) corresponds to a corner of a block, distortion (x, y) may be defined in the distortion map. In particular embodiments, the distortion characteristics may indicate that each block on the screen of the display system has piece-wise linear characteristic. A distortion-applied location of any point within a piece-wise linear block may be determined by a bi-linear interpolation of distortion-applied locations of four corners of the block. If the pixel (a, b) does not correspond to a corner of a block, distortion (x, y) may be determined by a bi-linear interpolation of distortion-applied locations of four corners of the block the pixel (a, b) belongs to. Although this disclosure describes determining a distortion-applied location of a point in a particular manner, this disclosure contemplates determining a distortion-applied location of a point in any suitable manner.

Figure 3C:
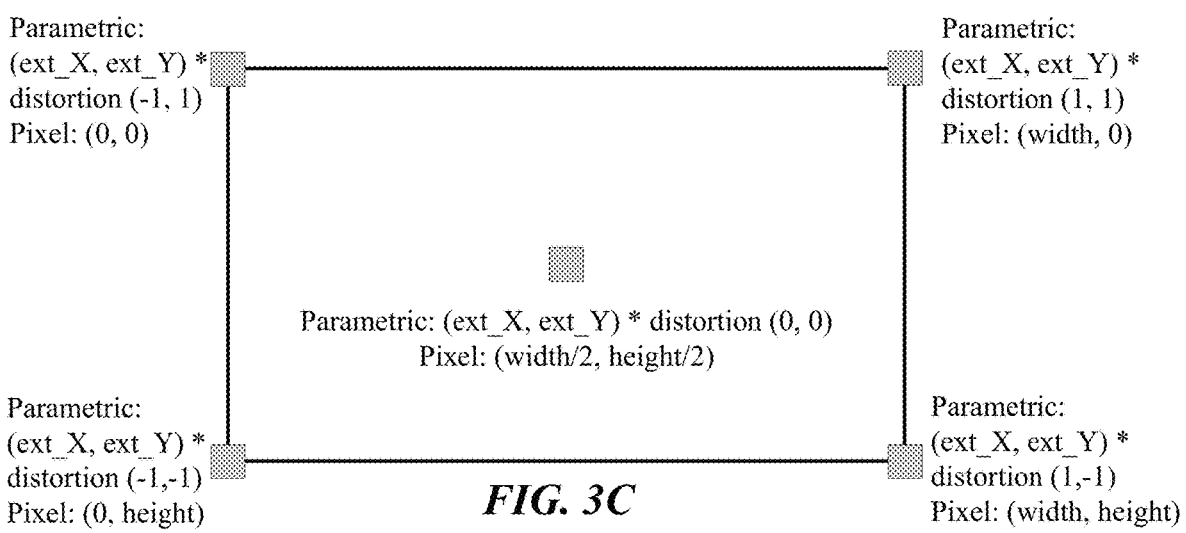
FIG. 3C illustrates an example field-of-view (FoV)-adjusted distorted display coordinate system.

FIG. 3C illustrates an example field-of-view (FoV)-adjusted distorted display coordinate system. The FoV may be the extent of the world that can be captured by a camera. The FoV may define a maximum angle from the forward direction visible along the vertical axis. Thus, an extent of Y, denoted by ext_Y in FIG. 3C, may be tan (FoV/2). An extent of X, denoted by ext_X in FIG. 3C, may be tan (FoV/2) *aspect ratio. The parametric coordinates for the FoV-adjusted distorted display space span in [−ext_X, ext_X] range for X axis and span in [−ext_Y, ext_Y] range for Y axis. A parametric coordinate (ext_X, ext_Y)*distortion (−1.0, 1.0) may indicate a distortion-applied location for the upper-left corner of the FoV-adjusted distorted display space. A parametric coordinate (ext_X, ext_Y)*distortion (−1.0, −1.0) may indicate a distortion-applied location for the lower-left corner of the normalized display space. A parametric coordinate (ext_X, ext_Y)*distortion (1.0, 1.0) may indicate a distortion-applied location for the upper-right corner of the normalized display space. A parametric coordinate (ext_X, ext_Y)*distortion (1.0, −1.0) may indicate a distortion-applied location for the lower-right corner of the normalized display space. A parametric coordinate (ext_X, ext_Y)*distortion (0.0, 0.0) may indicate a distortion-applied location for the center of the normalized display space. In particular embodiments, the FoV adjustment may be implicitly achieved by the distortion map.

In particular embodiments, the computing device 108 may determine a visibility of the triangle primitive relative to pixels of the screen by comparing the projected triangle primitive and the distorted grid representation of the screen. To determine the visibility of the triangle primitive relative to pixels of the screen, the computing device 108 may first identify candidate blocks whose bounding boxes overlap with a bounding box of the projected triangle primitive for each tile. Then, the computing device 108 may identify candidate sub-blocks of a pre-determined size that overlap with the projected triangle primitive for each of the identified candidate blocks. Finally, the computing device 108 may determine whether each pixel within each candidate sub-block covers the projected triangle primitive. Although this disclosure describes determining a visibility of the triangle primitive relative to pixels of the screen in a particular manner, this disclosure contemplates determining a visibility of the triangle primitive relative to pixels of the screen in any suitable manner.

Figure 4A:
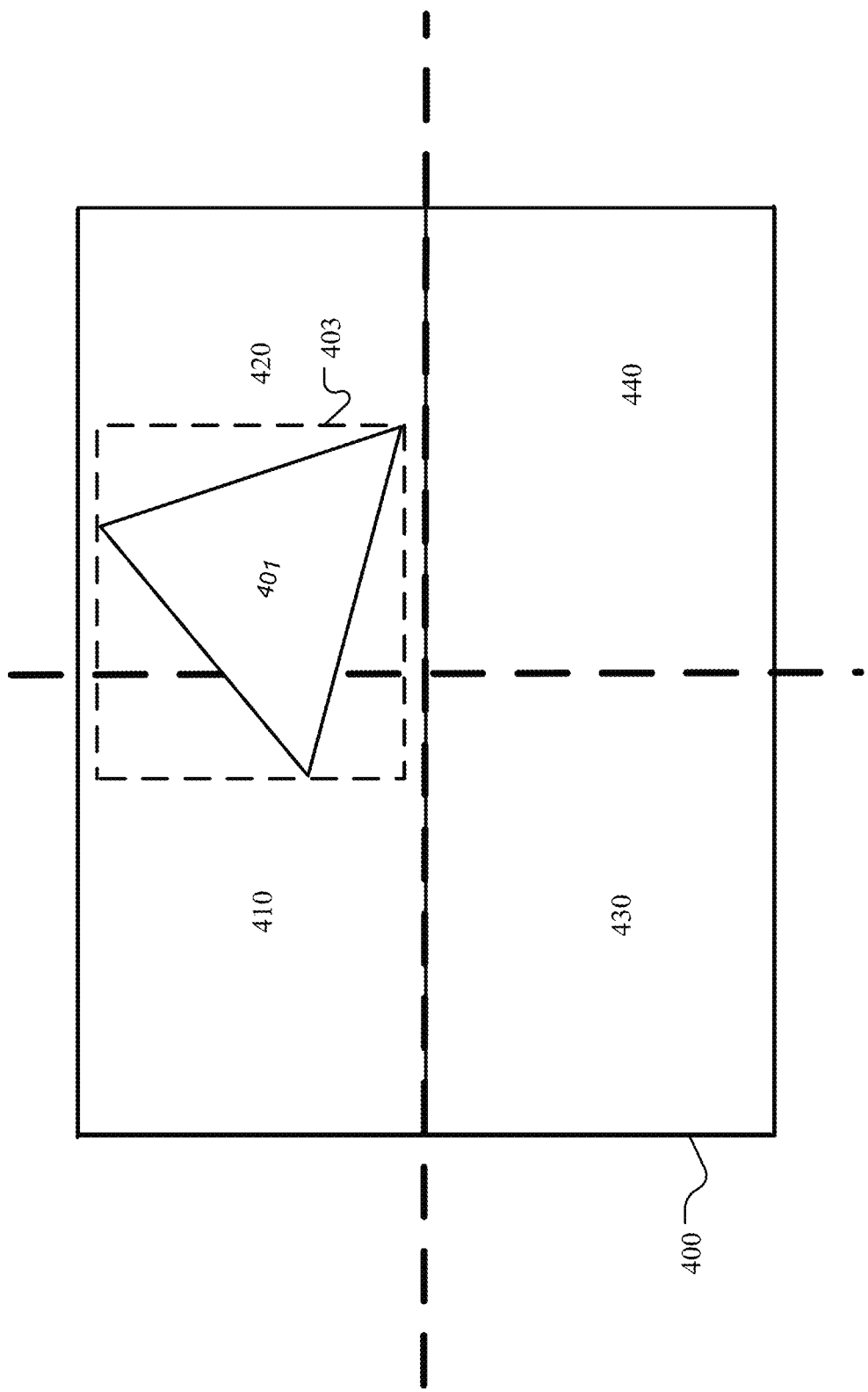
FIG. 4A-4C illustrate an example coarse visibility test for a distorted rectangular region against the projected triangle primitive.
Figure 4B:
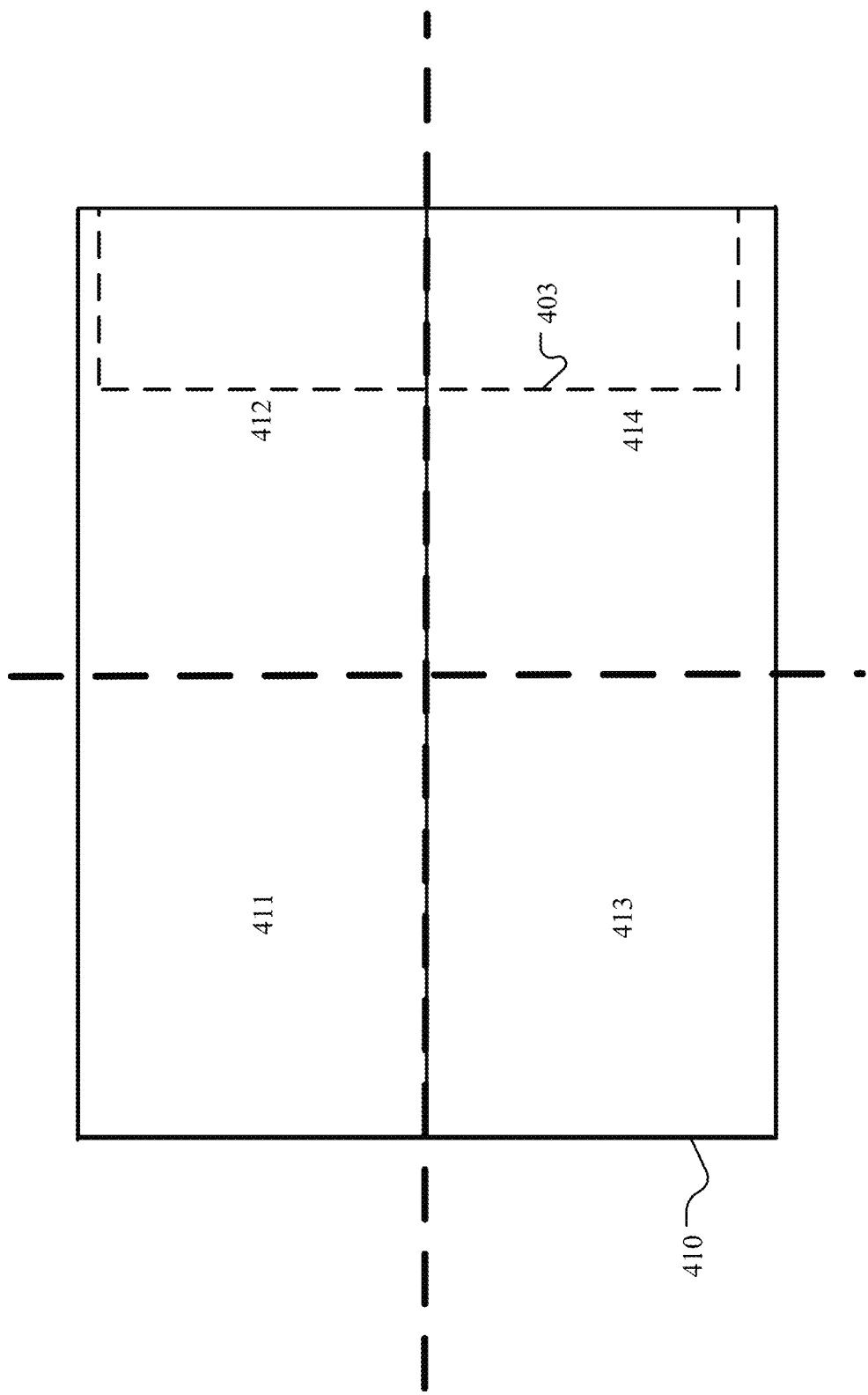
Figure 4C:
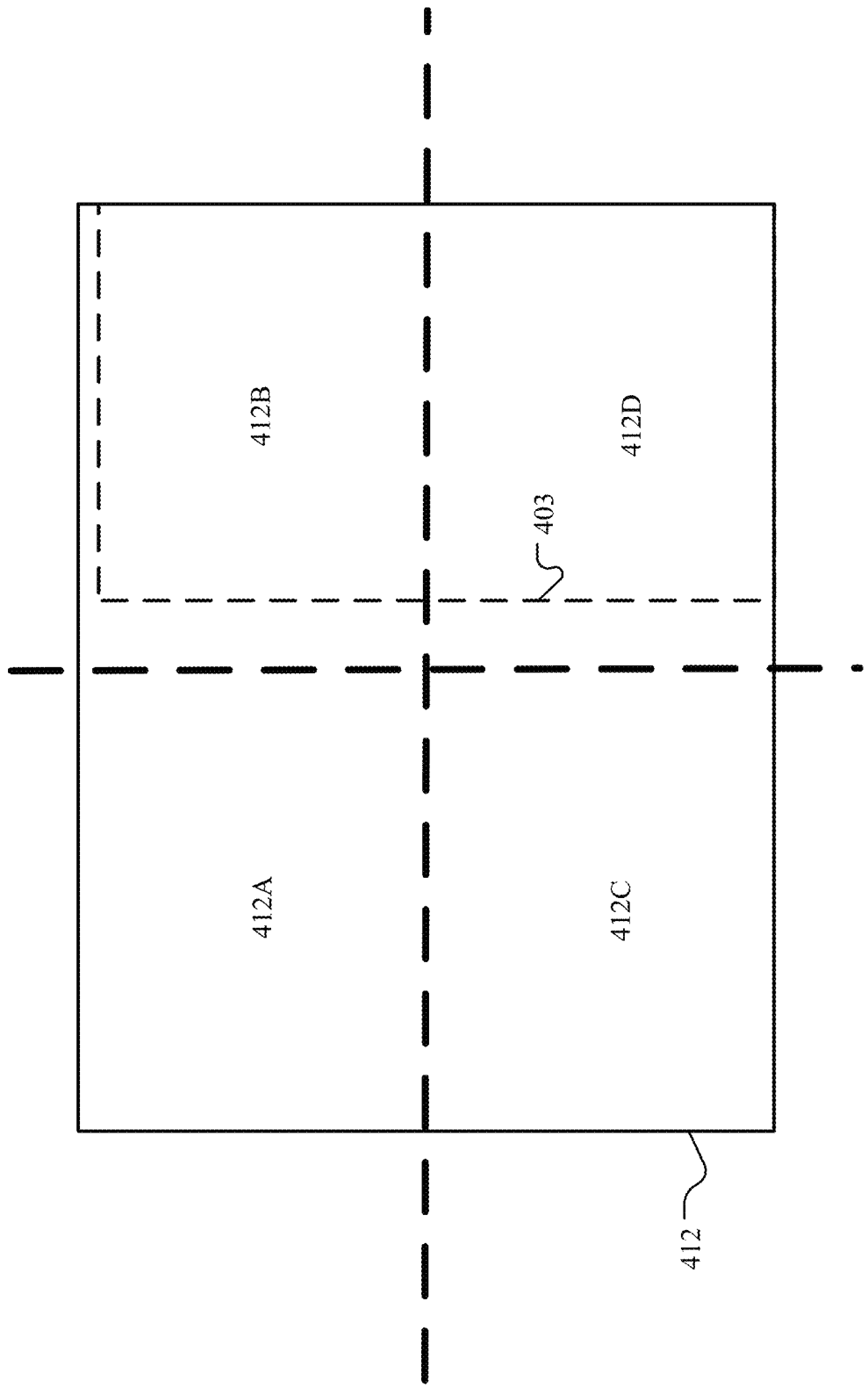

In particular embodiments, the computing device 108 may perform a recursive coarse visibility test for a tile against the projected triangle primitive to identify candidate blocks within the tile. The recursive coarse visibility test for a distorted rectangular region against a projected triangle primitive may be performed as following: The computing device 108 may determine whether a bounding box of the distorted rectangular region overlaps with the bounding box of the projected triangle primitive. If the bounding box of the distorted rectangular region is determined not to overlap with the bounding box of the projected triangle primitive, the distorted rectangular region does not need to be processed further. Thus, the current coarse visibility test procedure may return to a parent procedure. If the bounding box of the distorted rectangular region is determined to overlap with the bounding box of the projected triangle primitive, the computing device 108 may check whether a size of the distorted rectangular region is greater than a size of a block. If the size of the distorted rectangular region equals the size of a block, the computing device 108 may add the distorted rectangular region to a pool of candidate blocks. The current coarse visibility test procedure may return to a parent procedure. If the size of the distorted rectangular region is greater than the size of a block, the computing device 108 may divide the distorted rectangular region into a plurality of rectangular sub-regions. Each of the plurality of rectangular sub-regions may comprise one or more blocks. Then, the computing device 108 may perform a recursive coarse visibility test for each of the plurality of rectangular sub-regions against the projected triangle primitive. FIGS. 4A-4C illustrate an example coarse visibility test for a distorted rectangular region against the projected triangle primitive. FIG. 4A depicts a part of a display system 400, which comprises four tiles, 410, 420, 430 and 440. As an example and not by way of limitation, illustrated in FIG. 4A, the computing device 108 may perform a recursive coarse visibility test for a tile 410 against the projected triangle primitive 401 to identify candidate blocks 405. In the example illustrated in FIG. 4A, a tile comprises 4×4 blocks. The computing device 108 may determine that bounding boxes of the tiles 430 and 440 do not overlap the bounding box 403 of the projected triangle primitive. Thus, the computing device 108 may stop performing the recursive coarse visibility test for the tiles 430 and 440. The computing device 108 may determine that bounding boxes of the tiles 410 and 420 overlap the bounding box 403 of the projected triangle primitive 401, and the computing device 108 may check that the size of the tiles 410 and 420 is greater than the size of a block. To continue the coarse visibility test for the tile 410, the computing device 108 may divide the tile 410 into four sub-tiles 411, 412, 413 and 414 as depicted in FIG. 4B. The computing device 108 may perform a recursive coarse visibility test for each of the sub-tiles 411, 412, 413 and 414 against the projected triangle primitive 401. The computing device 108 may determine that the bounding boxes of sub-tiles 411 and 413 do not overlap the bounding box 403 of the projected triangle primitive 401. Thus, the computing device 108 may stop performing the recursive coarse visibility test for the sub-tiles 411 and 413. The computing device 108 may determine that bounding boxes of sub-tiles 412 and 414 overlap the bounding box 403 of the projected triangle primitive 401. The computing device 108 may check that the size of the sub-tiles 412 and 414 is greater than the size of a block. To continue the coarse visibility test for the sub-tile 412, the computing device 108 may divide the sub-tile 412 into four blocks 412A, 412B, 412C and 412D as depicted in FIG. 4C. The computing device 108 may perform a recursive coarse visibility test for each of the blocks 412A, 412B, 412C and 412D against the projected triangle primitive 401. The computing device may determine that the bounding boxes of the blocks 412A and 412C do not overlap the bounding box 403 of the projected triangle primitive 401. Thus, the computing device may stop performing the recursive coarse visibility test for the blocks 412A and 412C. The computing device 108 may determine that the bounding boxes of the blocks 412B and 412D overlap the bounding box 403 of the projected triangle primitive 401. The computing device 108 may check that the size of the blocks 412B and 412D equals the size of a block. Thus, the computing device 108 may identify the blocks 412B and 412D as candidate blocks. In particular embodiments, the size of a candidate block may be identical to the size of a block in the distortion map. In particular embodiments, the size of a candidate block may be an integer multiple of the size of a block in the distortion map. In particular embodiments, the size of a block in the distortion map may be an integer multiple of the size of a candidate block. Although this disclosure describes identifying candidate blocks whose bounding boxes overlap with a bounding box of a projected triangle primitive in a particular manner, this disclosure contemplates identifying candidate blocks whose bounding boxes overlap with a bounding box of a projected triangle primitive in any suitable manner.

In particular embodiments, the computing device 108 may perform a recursive coarse visibility test for a tile against a group of projected triangle primitives to accelerate the process. The computing device 108 may project eight vertices of a three-dimensional space bounding box for a group of three-dimensional triangle primitives into two-dimensional distorted screen space. Then, the computing device 108 may identify four corners of an axis-aligned two-dimensional bounding box for the group of projected triangle primitives that fits the eight projected vertices. An axis-aligned bounding box may be a bounding box whose cuboid edges are along the orthonormal basis of the space (e.g. X, Y axes). If the computing device 108 determines that a tile does not overlap the two-dimensional bounding box for the group of projected triangle primitives, the computing device 108 may not need to perform the recursive coarse visibility test for the tile against any of the group of projected triangle primitives. If the computing device determines that the tile overlaps the two-dimensional bounding box for the group of projected triangle primitives, the computing device 108 may perform a recursive coarse visibility test for the tile against each of the group of projected triangle primitives. The computing device 108 may determine the bounding box 403 of each of the group of projected triangle primitive 401. Although this disclosure describes determining a bounding box of a projected triangle primitive in a particular manner, this disclosure contemplates determining a bounding box of a projected triangle primitive in any suitable manner.

In particular embodiments, the computing device 108 may identify a bounding box of a distorted rectangular region. In order to identify the bounding box of the distorted rectangular region, the computing device 108 may calculate a maximum of distortion-applied location coordinates corresponding to corners of blocks within the distorted rectangular region and a minimum of distortion-applied location coordinates corresponding to corners of blocks within the distorted rectangular region. Once the distortion-applied locations for corners of the distorted rectangular region are identified, a rectangular box with the identified corners may be identified as the bounding box of the distorted rectangular region. A bounding box of a distorted rectangular region may be an axis-aligned bounding box. Although this disclosure describes identifying a bounding box of a distorted rectangular region in a particular manner, this disclosure contemplates identifying a bounding box of a distorted rectangular region in any suitable manner.

Figure 5:
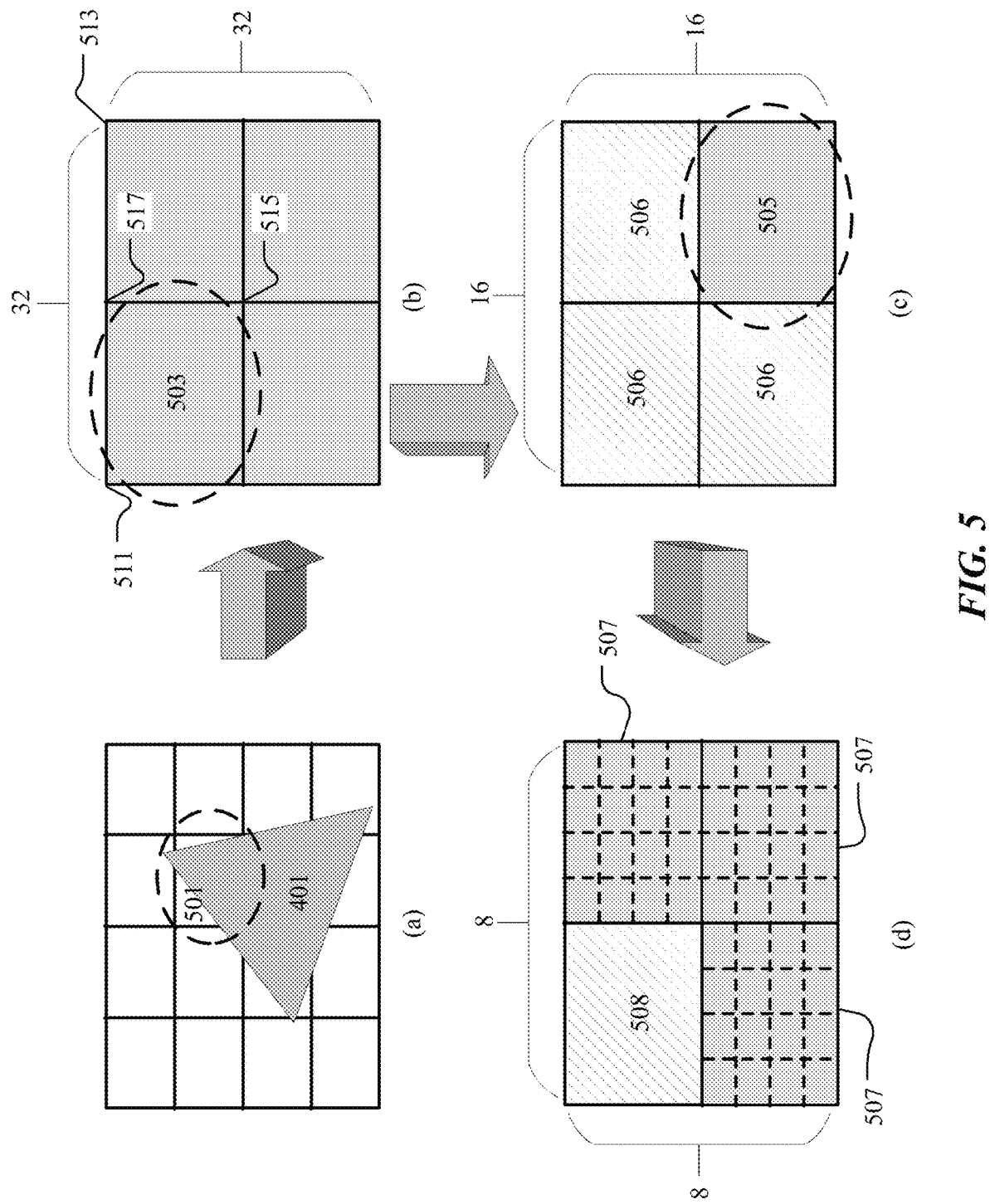
FIG. 5 illustrates an example fine visibility test for a rectangular region against a projected triangle primitive.

In particular embodiments, the computing device 108 may perform a recursive fine visibility test for a block against the projected triangle primitive to identify candidate sub-blocks of the pre-determined size within the block. The recursive fine visibility test for a rectangular region against a projected triangle primitive may be performed as following: The computing device 108 may identify a distortion-applied location of each corner of the rectangular region. The computing device 108 may determine whether the rectangular region overlaps with the projected triangle primitive. If the rectangular region is determined not to overlap with the projected triangle primitive, the rectangular region does not need to be processed further. Thus, the current fine visibility test procedure may return to a parent procedure. If the rectangular region is determined to overlap with the projected triangle primitive, the computing device 108 may check that a size of the rectangular region is greater than the pre-determined size. If the size of the rectangular region equals the pre-determined size, the computing device 108 may add the rectangular region to a pool of candidate sub-blocks. The current fine visibility test procedure may return to a parent procedure. If the size of the rectangular region equals the pre-determined size, the computing device 108 may split the rectangular region into a plurality of rectangular sub-regions. The computing device 108 may perform a recursive fine visibility test for each of the plurality of rectangular sub-regions against the projected triangle primitive. FIG. 5 illustrates an example fine visibility test for a rectangular region against a projected triangle primitive. As an example and not by way of limitation, illustrated in FIG. 5, the computing device 108 may identify candidate sub-blocks that overlap with a projected triangle primitive 401. At a step illustrated by (a) of FIG. 5, the computing device 108 may identify a block 501 as one of candidate blocks as a result of recursive coarse visibility tests for one or more tiles against the projected triangle primitive 401. At a step illustrated by (b) of FIG. 5, the computing device 108 may identify distortion-applied locations of corners of the block 501 by looking up the distortion map. The computing device 108 may determine that the block 501 overlaps with the projected triangle primitive 401. The details of the determination procedure are disclosed below. The computing device 108 may check whether the size of the block, 32×32 in the example illustrated in FIG. 5, is greater than the pre-determined size, which is 4×4 in this example. Because the size of the block 501 is greater than the pre-determined size, the computing device 108 may split the block into four sub-blocks including the sub-block 503, where a size of each sub-block is 16×16. The computing device 108 may perform a recursive fine visibility test for each of the sub-blocks against the projected triangle primitive 401. At a step illustrated by (c) of FIG. 5, the computing device 108 may perform a fine visibility test for the sub-block 503 against the projected triangle primitive 401. The size of the sub-block 503 is 16×16. The computing device 108 may identify distortion-applied locations of corners of the sub-block 503. The computing device 108 may determine that the sub-block 503 overlaps with the projected triangle primitive 401. The computing device 108 may check whether the size of the sub-block 503, 16×16, is greater than the pre-determined size, 4×4. Because the size of the sub-block 503 is greater than the pre-determined size, the computing device 108 may split the sub-block 503 into four sub-blocks including the sub-blocks 506 and the sub-block 505. The computing device 108 may perform a recursive fine visibility test for each of the sub-blocks 505, 506 against the projected triangle primitive 401. Because the sub-blocks 506 are determined not to overlap with the projected triangle primitive 401 during their respective fine visibility tests, the computing device 108 may not process the sub-blocks 506 further. At a step illustrated by (d) of FIG. 5, the computing device 108 may perform a fine visibility test for a sub-block 505 against the projected triangle primitive 401. The size of the sub-block 505 is 8×8. The computing device 108 may identify distortion-applied locations of corners of the sub-block 505. The computing device 108 may determine that the sub-block 505 overlaps with the projected triangle primitive 401. Since the size of the sub-block 505, 8×8, is greater than the pre-determined size, 4×4, the computing device 108 may split the sub-block 505 into four sub-blocks including the sub-blocks 507 and the sub-block 508. The computing device 108 may perform a recursive fine visibility test for each of the sub-blocks 507, 508 against the projected triangle primitive 401. Because the sub-block 508 is determined not to overlap with the projected triangle primitive 401 during its fine visibility test, the computing device 108 may not process the sub-block 508 further. The sub-blocks 507 may be added to a pool of candidate sub-blocks because the computing device 108 may determine that the sub-blocks 507 overlap with the projected triangle primitive 401 and because the size of the sub-blocks 507, 4×4, equals the pre-determined size, 4×4. Although this disclosure describes identifying candidate sub-blocks of a pre-determined size in a particular manner, this disclosure contemplates identifying candidate sub-blocks of a pre-determined size in any suitable manner.

In particular embodiments, a piece-wise linear rectangular region may be a block. The computing device 108 may look up the distortion map to identify a distortion-applied location of a corner of the block. As an example and not by way of limitation, illustrated in (b) of FIG. 5, the computing device 108 may identify a distortion-applied location of an upper-left corner 511 of the block 501 by looking up the distortion map, which defines a distortion-applied location of each corner of each block in a screen of the display system. Although this disclosure describes identifying a distortion-applied location of a corner of a block in a particular manner, this disclosure contemplates identifying a distortion-applied location of a corner of a block in any suitable manner.

In particular embodiments, a piece-wise linear rectangular region may be a sub-region of a second piece-wise linear rectangular region. The second piece-wise linear rectangular region may be a block or a sub-block. In particular embodiments, a first corner of the piece-wise linear rectangular region may be inside of the second piece-wise linear rectangular region. The computing device 108 may perform a bi-linear interpolation of distortion-applied locations corresponding to four corners of the second piece-wise linear rectangular region to identify a distortion-applied location of the first corner comprises. As an example and not by way of limitation, illustrated in (b) of FIG. 5, the computing device 108 may identify a distortion-applied location of a lower-right corner 515 of the sub-block 503 by performing a bi-linear interpolation of distortion-applied locations corresponding to four corners of the block 501. Although this disclosure describes identifying a distortion-applied location of a corner of a sub-block that is inside of a block in a particular manner, this disclosure contemplates identifying a distortion-applied location of a corner of a sub-block that is inside of a block in any suitable manner.

In particular embodiments, a corner of a piece-wise linear rectangular region may be on an edge connecting two corners of a second piece-wise linear rectangular region. The computing device 108 may perform a linear interpolation of distortion-applied locations for the two corners of the second piece-wise linear rectangular region connected by the edge to identify a distortion-applied location of the corner. As an example and not by way of limitation, illustrated in (b) of FIG. 5, the computing device 108 may identify a distortion-applied location of an upper-right corner 517 of the sub-block 503 by performing a linear interpolation of distortion-applied locations for the upper-left corner 511 and the upper-right corner 513 of the block 501. Although this disclosure describes identifying a distortion-applied location for a corner of a sub-block that is on an edge connecting two corners of a block in a particular manner, this disclosure contemplates identifying a distortion-applied location for a corner of a sub-block that is on an edge connecting two corners of a block in any suitable manner.

Figure 6:
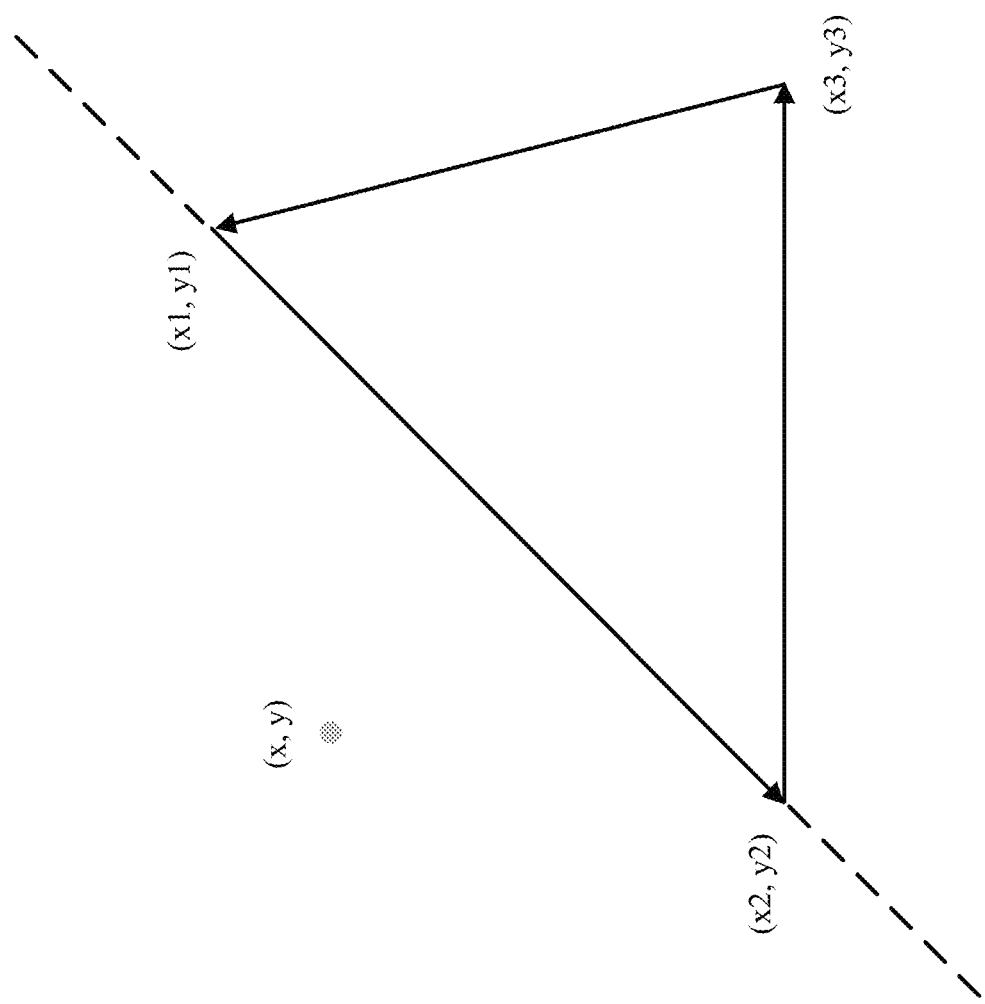
FIG. 6 illustrates an example scenario for determining whether a point is on a pre-determined side of a directional edge of a triangle primitive.

In particular embodiments, the computing device 108 may determine whether at least one corner of a rectangular region is on a pre-determined side of each of directional edges of the projected triangle primitive 401 to determine whether the rectangular region overlaps with the projected triangle primitive 401. Directions of the directional edges of the projected triangle primitive may be anticlockwise. The pre-determined side may be a left side. FIG. 6 illustrates an example scenario for determining whether a point is on a pre-determined side of a directional edge of a triangle primitive. As an example and not by way of limitation, illustrated in FIG. 6, an edge of the projected triangle primitive 401 connects a first vertex (x1, y1) to a second vertex (x2, y2). An extended line connecting the two vertices may partition a two-dimensional plane into two halves. A corresponding edge function A corresponding edge function $f(x, y)=(y-y1)*(x2-x1)-(x-x1)*(y2-y1)$ may determine which side of the edge a point (x, y) locates. If the output of the edge function is a negative number, the point (x, y) is on a right side of the directional edge. If the output of the edge function is a positive number, the point (x, y) is on a left side of the directional edge. If the output of the edge function is zero, the point (x, y) is on the edge. The edge function can be generalized to three or higher dimensions by generalizing the directional edge to a directional half-plane which partitions the space into two half spaces—inside and outside The edge function may be used similarly with a raycaster in a higher dimensional space. The computing device 108 may determine that the rectangular region overlaps with the projected triangle primitive 401 if at least one corner of a rectangular region is on the left side of each of directional edges of the projected triangle primitive 401. Although this disclosure describes determining whether a rectangular region overlaps with a projected triangle primitive with edge functions corresponding to the directional edges of the projected triangle primitive in a particular manner, this disclosure contemplates determining whether a rectangular region overlaps with a projected triangle primitive with edge functions corresponding to the directional edges of the projected triangle primitive in any suitable manner.

In particular embodiments, the computing device 108 may determine whether each pixel within a candidate sub-block covers the projected triangle primitive 401. To determine whether a pixel covers the projected triangle primitive 401, the computing device 108 may identify a distortion-applied sampling location within the pixel. The computing device 108 may determine whether the identified location is on a pre-determined side of each directional edge of the projected triangle primitive 401. If the identified location is on the pre-determined side of each and every directional edge of the projected triangle primitive 401, the computing device 108 may determine that the pixel covers the projected triangle primitive 401. Although this disclosure describes determining whether a pixel within a candidate sub-block covers the projected triangle primitive in a particular manner, this disclosure contemplates determining whether a pixel within a candidate sub-block covers the projected triangle primitive in any suitable manner.

In particular embodiments, the computing device 108 may render an image based on the determined visibility of the triangle primitive. If a pixel is determined to cover a projected triangle primitive, the computing device 108 may determine a color value for the pixel based on properties associated with the projected triangle primitive. The rendered image may be configured to be displayed by the screen of the display system that has the distortion characteristics. Although this disclosure describes rendering an image based on the determined visibility of the triangle primitive in a particular manner, this disclosure contemplates rendering an image based on the determined visibility of the triangle primitive in any suitable manner.

Figure 7:
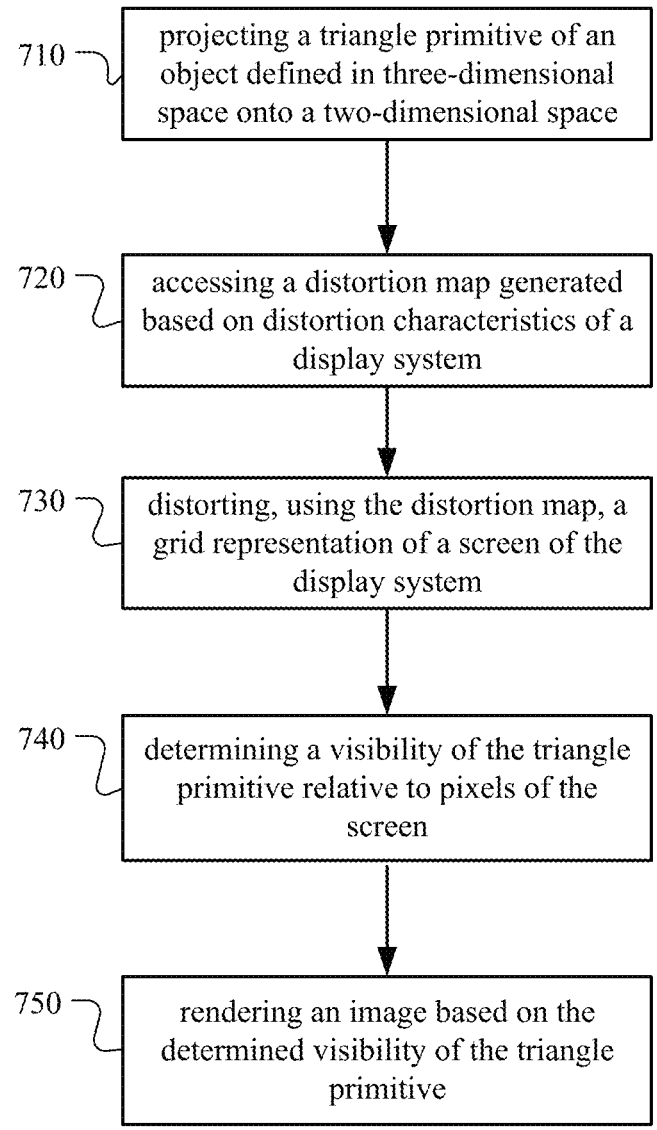
FIG. 7 illustrates an example method for determining a visibility of a triangle primitive relative to pixels of a screen of a display system.

FIG. 7 illustrates an example method 700 for determining a visibility of a triangle primitive relative to pixels of a screen of a display system. The method may begin at step 710, where the computing device 108 may project a triangle primitive of an object defined in three-dimensional space onto a two-dimensional space. At step 720, the computing device 108 may access a distortion map generated based on distortion characteristics of a display system. At step 730, the computing device 108 may distort a grid representation of a screen of the display system using the distortion map. At step 740, the computing device 108 may determine a visibility of the triangle primitive relative to pixels of the screen by comparing the projected triangle primitive and the distorted grid representation of the screen. At step 750, the computing device 108 may render an image based on the determined visibility of the triangle primitive. The rendered image may be configured to be displayed by the screen of the display system having the distortion characteristics. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining a visibility of a triangle primitive relative to pixels of a screen of a display system including the particular steps of the method of FIG. 7, this disclosure contemplates any suitable method for determining a visibility of a triangle primitive relative to pixels of a screen of a display system including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
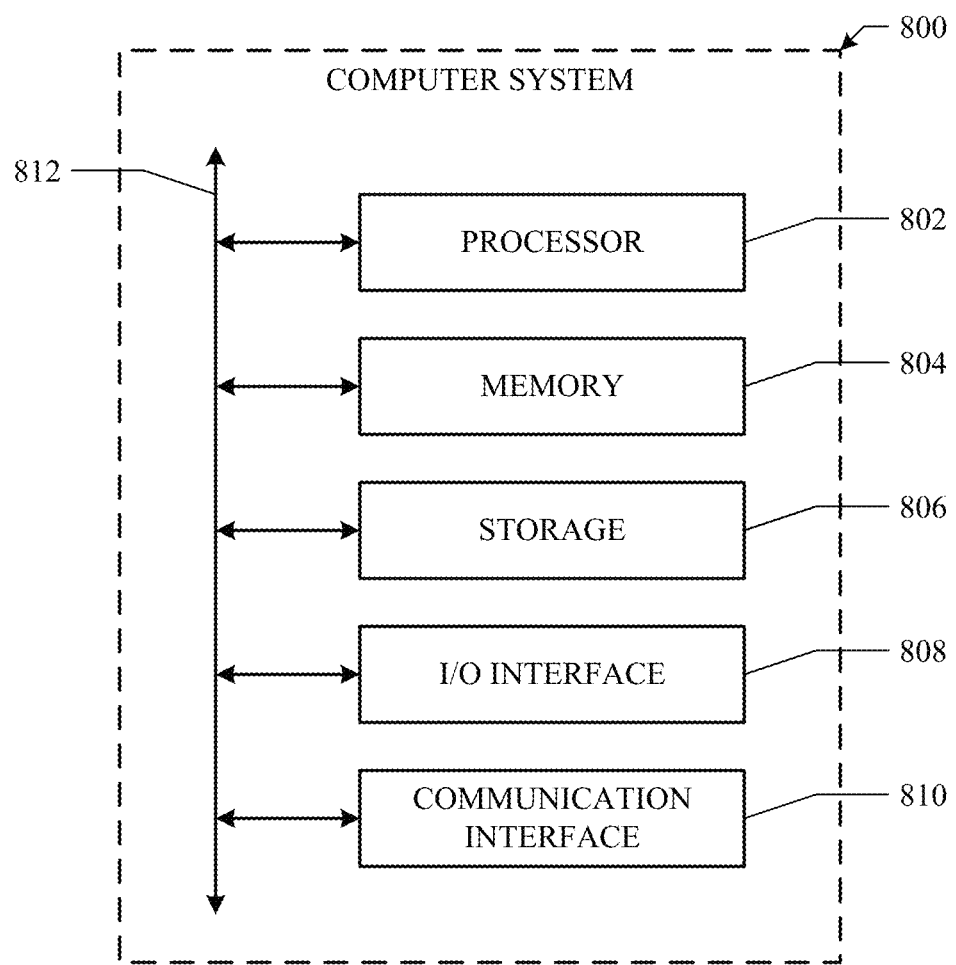
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806;

or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   projecting a triangle primitive of an object defined in three-dimensional space onto a two-dimensional space;
   accessing a distortion map generated based on distortion characteristics of a display system;
   generating, using the distortion map, a non-uniform grid representation of a screen of the display system by adjusting a location of each corner of each block within an uniform grid representation of the screen of the display system to a distortion-applied location defined by the distortion map, wherein the non-uniform grid representation of the screen and the uniform grid representation of the screen are different;
   rasterizing the projected triangle primitive to determine a visibility of the projected triangle primitive relative to pixels of the screen, wherein rasterizing comprises mapping the projected triangle primitive in the two-dimensional space to the non-uniform grid representation of the screen; and
   rendering an image based on the determined visibility of the triangle primitive, the rendered image being configured to be displayed by the screen of the display system having the distortion characteristics.

2. The method of claim 1, wherein a grid representation of the screen of the display system comprises one or more blocks of pixels.

3. The method of claim 2, wherein the distortion map defines a distorted location in the screen of the display system for each corner of each block in the grid representation, and wherein the distortion characteristics indicate that each block on the screen of the display system has piece-wise linear characteristic.

4. The method of claim 3, wherein a distorted location of any point within a piece-wise linear block is determined by a bi-linear interpolation of distorted locations of four corners of the block.

5. The method of claim 3, wherein rasterizing the projected triangle primitive to determine a visibility of the projected triangle primitive relative to pixels of the screen comprises:
   identifying, for each non-uniform rectangular region, candidate blocks whose bounding boxes overlap with a bounding box of the projected triangle primitive;
   identifying, for each of the identified candidate blocks, candidate sub-blocks of a pre-determined size that overlap with the projected triangle primitive; and
   determining, for each pixel within each candidate sub-block, whether the pixel covers the projected triangle primitive.

6. The method of claim 5, wherein identifying candidate blocks for a non-uniform rectangular region comprises performing a recursive coarse visibility test for the non-uniform rectangular region against the projected triangle primitive.

7. The method of claim 6, wherein a recursive coarse visibility test for a non-uniform rectangular region against the projected triangle primitive comprises:
   determining whether a bounding box of the non-uniform rectangular region overlaps with the bounding box of the projected triangle primitive;
   checking, in response to the determination, whether a size of the non-uniform rectangular region is greater than a size of a block;
   dividing, in response to the checking, the non-uniform rectangular region into a plurality of rectangular sub-regions, wherein each of the plurality of rectangular sub-regions comprises one or more blocks; and
   performing, for each of the plurality of rectangular sub-regions, a recursive coarse visibility test for the rectangular sub-region against the projected triangle primitive.

8. The method of claim 7, wherein a bounding box of a non-uniform rectangular region is identified by calculating a maximum of distorted location coordinates corresponding to corners of blocks within the non-uniform rectangular region and a minimum of distorted location coordinates corresponding to corners of blocks within the non-uniform rectangular region.

9. The method of claim 5, wherein a bounding box of one or more projected triangle primitives including the projected triangle primitive is determined by:
projecting eight vertices of three-dimensional space bounding box for the one or more three-dimensional triangle primitives into two-dimensional non-uniform screen space; and
identifying four corners of a two-dimensional bounding box that fits the eight projected vertices.

10. The method of claim 5, wherein identifying candidate sub-blocks of the pre-determined size comprises performing a recursive fine visibility test for the block against the projected triangle primitive.

11. The method of claim 10, wherein a recursive fine visibility test for a rectangular region against the projected triangle primitive comprises:
identifying, for each corner of the rectangular region, a distorted location of the corner;
determining whether the rectangular region overlaps with the projected triangle primitive;
checking, in response to the determination, that a size of the rectangular region is greater than the pre-determined size;
splitting, in response to the checking, the rectangular region into a plurality of rectangular sub-regions; and
performing, for each of the plurality of rectangular sub-regions, a recursive fine visibility test for the rectangular sub-region against the projected triangle primitive.

12. The method of claim 11, wherein, if the rectangular region is a block, identifying a distorted location of the corner comprises looking up the distortion map.

13. The method of claim 11, wherein, if the rectangular region is a sub-region of a second rectangular region and a first corner of the rectangular region is inside of the second rectangular region, identifying a distorted location of the first corner comprises performing a bi-linear interpolation of locations corresponding to four corners of the second rectangular region.

14. The method of claim 11, wherein, if the rectangular region is a sub-region of a second rectangular region and a first corner of the rectangular region is on an edge connecting two corners of the second rectangular region, identifying a distorted location of the first corner comprises performing a linear interpolation of locations for the two corners of the second rectangular region connected by the edge.

15. The method of claim 11, wherein determining whether the rectangular region overlaps with the projected triangle primitive comprises:
determining, for each of directional edges of the projected triangle primitive, whether at least one corner of the rectangular region is on a pre-determined side of the directional edge.

16. The method of claim 15, wherein directions of the directional edges of the projected triangle primitive are anticlockwise, and wherein the pre-determined side is a left side.

17. The method of claim 15, wherein determining whether a corner of the rectangular region is on the pre-determined side of a directional edge of the projected triangle primitive comprises computing an edge function corresponding to the directional edge for a distorted location of the corner of the rectangular region.

18. The method of claim 5, wherein determining whether the pixel covers the projected triangle primitive comprises:
identifying a sampling location within the pixel; and
determining, for each of directional edges of the projected triangle primitive, whether the identified location is on a pre-determined side of the edge.

19. One or more computer-readable non-transitory storage media embodying software that is operable when executed to:
project a triangle primitive of an object defined in three-dimensional space onto a two-dimensional space;
access a distortion map generated based on distortion characteristics of a display system;
generate, using the distortion map, a non-uniform grid representation of a screen of the display system by adjusting a location of each corner of each block within an uniform grid representation of the screen of the display system to a distortion-applied location defined by the distortion map, wherein the non-uniform grid representation of the screen and the uniform grid representation of the screen are different;
rasterize the projected triangle primitive to determine a visibility of the projected triangle primitive relative to pixels of the screen, wherein rasterizing comprises mapping the projected triangle primitive in the two-dimensional space to the non-uniform grid representation of the screen; and
render an image based on the determined visibility of the triangle primitive, the rendered image being configured to be displayed by the screen of the display system having the distortion characteristics.

20. A system comprising: one or more processors; and a non-transitory memory coupled to the processors comprising instructions executable by the processors, the processors operable when executing the instructions to:
project a triangle primitive of an object defined in three-dimensional space onto a two-dimensional space;
access a distortion map generated based on distortion characteristics of a display system;
generate, using the distortion map, a non-uniform grid representation of a screen of the display system by adjusting a location of each corner of each block within an uniform grid representation of the screen of the display system to a distortion-applied location defined by the distortion map, wherein the non-uniform grid representation of the screen and the uniform grid representation of the screen are different;
rasterize the projected triangle primitive to determine a visibility of the projected triangle primitive relative to pixels of the screen, wherein rasterizing comprises mapping the projected triangle primitive in the two-dimensional space to the non-uniform grid representation of the screen; and
render an image based on the determined visibility of the triangle primitive, the rendered image being configured to be displayed by the screen of the display system having the distortion characteristics.

* * * * *